Oct. 25, 1960 W. MEYER 2,957,356

FINE TUNING ATTACHMENT FOR INDEX TYPE OF TUNER

Filed July 20, 1959

United States Patent Office 2,957,356

Patented Oct. 25, 1960

2,957,356

FINE TUNING ATTACHMENT FOR INDEX TYPE OF TUNER

Walter Meyer, Mount Prospect, Ill., assignor to Oak Manufacturing Co., a corporation of Delaware Filed July 20, 1959, Ser. No. 828,300

12 Claims. (Cl. 74—10.27)

This invention relates to a fine tuning attachment for index type of tuner and particularly relates to an attachment for use with communication tuners such as for TV, radio and other fields of use.

Referring for example to TV reception, tuners, usually of the switch type, can be turned to any one of a number of index positions for selecting a desired channel for reception of a signal. As a rule, it is frequently necessary to provide some supplementary fine tuning adjustment for each channel setting to insure optimum performance. This supplementary fine tuning means may be manual in which case a separate manual adjustment for each selected index position of the tuner may be necessary. It has also been proposed to provide a means which can be pre-set for each index position so that preset fine tuning may be obtained corresponding to each index position. Such means have been mechanically quite complicated and expensive. In addition thereto, such means have taken considerable space and have not been readily adaptable to various tuners.

In accordance with the present invention, a simple construction is provided which may be readily adapted to any means associated with a mechanism such as a tuner for providing a fine tuning pre-set adjustment corresponding to each index position. The invention in general involves the use of a generally rigid tiltable plate which for convenience may be flat and whose tilt position will be determined by three points. Thus if the plate is flat, means are provided for mounting the plate in such a manner that it can tilt about a center. The plane in which the plate rests will be determined by two points which may be regarded as fixed and a third point which may be manually pre-set. The final tilt position of the plate as determined by these three points is utilized for controlling the adjustment of a fine tuning means.

In order that the invention may be understood it will be explained in connection with the drawing wherein.

Figures 1, 2, 3, 4, 5, 6, 7:
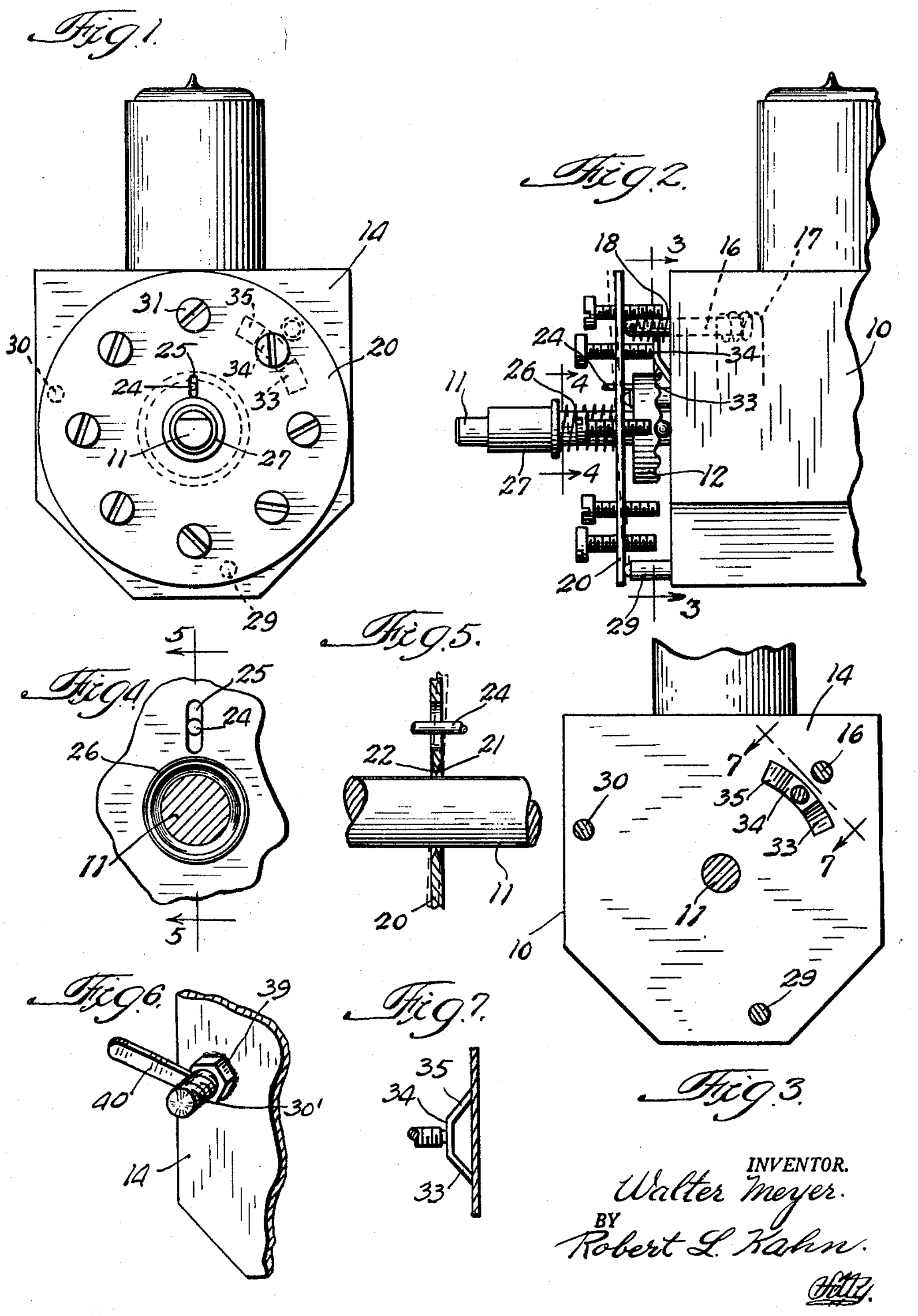
Figure 1 shows a front view of a device embodying the present invention attached to a tuner.
Figure 2 is a side elevation of the device illustrated in Figure 1.
Figure 3 is a sectional detail on line 3—3 of Figure 2.
Figure 4 is a sectional detail on line 4—4 of Figure 2.
Figure 5 is a sectional detail on line 5—5 of Figure 4.
Figure 6 is a view of a modification for providing a manual adjustment.
Figure 7 is a detail on line 7—7 of Figure 3.

The invention for convenience is illustrated in connection with a tuner for electrical apparatus such as for example a TV receiver. Such a tuner may be of the so-called switch type such as for example shown in United States Patent No. 2,835,818, issued May 20, 1958. Inasmuch as the details of the tuner are of no concern here, a detailed description thereof will not be given. In general, however, the tuner generally indicated by 10 has operating shaft 11 provided with index means 12 for selecting any one of a number of channels. As a rule, tuner 10 is designed to select any channel from 2 to 13 inclusive. It is understood that shaft 11 will have associated therewith a suitable knob and channel indicator.

Tuner 10 includes a housing having front panel 14. Projecting through panel 14 forwardly of the tuner is fine tuning operating plunger or rod 16 whose longitudinal position will serve to determine a fine tuning position. The fine tuning means itself may consist of a capacitor or an inductor and for simplicity, there is illustrated inductor 17 having a movable metal core attached to or forming part of or coupled in some manner to plunger 16. Inductor 17, as is usual in such devices, is connected to the oscillator section of the tuner and is adapted to shift the frequency of the oscillator enough for fine tuning.

It is clear that plunger 16 may be coupled to any kind of a fine tuning means and if the fine tuning means requires some rotary movement, then means may be provided for translating the longitudinal movement of plunger 16 to a rotary movement for tuning purposes.

Fine tuning plunger 16 is biased to an extreme outer portion by coil spring 18 operating between panel 14 of the housing and a pin or collar on plunger 16.

Cooperating with plunger 16 is rigid plate 20 preferably flat. Plate 20 may be a metal stamping and is provided with opening 21 through which shaft 11 can pass. Plate 20 must be tiltable about shaft 11 through a sufficient angle for operating plunger 16. Accordingly, plate 20 has metal edge 22 bordering clearance opening 21 shaped to provide a knife edge. Thus plate 20 can tilt with respect to shaft 11 through a suitable angle without excessive lateral play.

Plate 20 is rotatably locked to shaft 11 to turn therewith. For this purpose, a direct mechanical lock between index means 12 and the plate happens to be convenient. Thus index member 12 which itself is rotatably locked to shaft 11 carries pin 24 projecting through slot 25 in plate 20. Slot 25 is elongated radially of shaft 11 so that the plate can tilt with respect to the shaft while still maintaining the rotary coupling.

Cooperating with plate 20 is coil spring 26 extending between the plate at the front face thereof and collar 27 locked to shaft 11. Coil spring 26 urges plate 20 toward panel 14 of the tuner housing. The actual position assumed by plate 20 is controlled by the following means.

Carried by front panel 14 of the tuner housing are pins 29 and 30 so disposed as to engage the inside face of plate 20 near the edge thereof. Disposed in a circular pattern about the shaft are adjustable members 31 which may in their simplest form consist of bolts operating in threaded apertures provided with any suitable means for preventing the bolts from turning freely in the threaded recesses of plate 20. Such means may consist of fibre washers, or other suitable means well known in the art, the bolt retaining means simply providing a frictional force for maintaining the bolt in any desired rotary position but permitting the bolt to be turned with a screwdriver or other suitable means to a desired adjusted position.

For ease in illustration, bolts 31 as shown in Figure 1 are eight in number. It is understood that there will be one bolt corresponding to each index position and this in turn will correspond to each channel selection. Thus if the tuner illustrated in Figure 1 has eight positions, then the index means will provide for eight positions and it will be possible to select any one of eight channels. If however, there are twelve positions for the tuner, then there will be twelve bolts 31. It will also be understood that the arrangement of bolts insofar as angular spacing between them is concerned will also correspond to index positions. In most cases, a tuner has equal angular intervals of the control shaft for selecting channel settings. In such case, the spacing of bolts 31 will also be equal.

Bolts 31 are arranged in a circular pattern which has a radius different from the radial distance of pins 29 and 30 from the center of shaft 11. The simplest construction will have pins 29 and 30 adjacent the edge of plate 20 and will have bolts 31 arranged in a circular pattern well within the edge of the plate. Plunger 16 also cooperates with the edge of the plate.

Cooperating with bolts 31 is projecting part 33 carried by panel 14 of the housing. The most desirable arrangement for projection 33 is radially in line with fine tuner plunger 16. However, other positions for projection 33 are possible, it being understood however that projection 33 will be so oriented as to occupy an index position. Thus irrespective of where projection 33 is disposed, insofar as its orientation is concerned, a bolt 31 will always rest upon projection 33 in any index position.

Projection 33 extends outwardly from panel 14 toward plate 20 and provides flat surface 34 with inclined ramps or cam surfaces 35 leading away from both sides of the projection with reference to the direction of rotation. Flat portion 34 is preferably wide enough along the direction of rotation so that the tip of any bolt 31 can rest upon flat 34 without changing the tilt position of plate 20 even though there might be some rotary play.

It is clear that the tilt position of plate 20 can be adjusted for an index position by adjusting the bolt 31 corresponding to that position. It is necessary that the force required to operate plunger 16 for fine tuning be small enough so that coil spring 26 can keep plate 20 in the desired tilt position. Thus coil spring 26 will be stiff enough so that plunger 16 can be moved to any position corresponding to the bolt adjustment and keeping plate 20 on the three-point support provided by flat 34 and pins 29 and 30.

Under some circumstances it may be desirable to superimpose a manual adjustment by a user distinct from the adjustment afforded by turning each bolt 31. A simple means for accomplishing this involves making one of fixed pins 29 or 30 adjustable. Thus referring to Figure 6, pin 30' is provided with a coarse thread cooperating with nut 39 carried by panel 14 of the tuner housing. Pin 30' has rigidly attached thereto handle 40. By turning handle 40, pin 30' will move in or out in nut 39 carried by panel 14 and cause the top face of the pin to be located at a desired distance away from panel 14. Handle 40 may be provided at a location which is convenient for the average TV user and may be used to provide temporary adjustments. As a rule, however, means will be provided for turning each bolt 31 either from the front or the back of a TV receiver so that manual adjustment illustrated in Figure 6 will generally not be necessary.

It will be apparent that the invention provides a simple construction which is readily adaptable to any means having a rotary index movement wherein some fine supplementary movement for each index position is required. The two pins 29 and 30 and projection 33 cooperate to provide a three-point support to determine the plane of disc-shaped plate 20. Any suitable means may be provided for urging the plate to assume the position determined by the three points of support. One of the three support points must be located at a different radial distance from the center of the disc than the other two support points. This will permit the disc to carry an array of adjustable members for cooperating with this odd support point. Thus, at each index position, a predetermined tilt to the plate is provided and this predetermined tilt is used to control the travel of plunger 16.

What is claimed is:

1. A fine tuning attachment for use with a device having a projecting shaft rotatable to a plurality of index positions, said attachment comprising a rigid disc having a central aperture for clearing said shaft and permitting the disc to tilt with respect to said shaft, means for rotatively coupling said disk and shaft when said attachment is installed, means for urging said disc as a whole in one direction along said shaft, said direction being toward the device when said attachment is installed, means providing three fixed support points angularly spaced around said shaft for limiting the movement of said disc in response to said disc urging means, one such support point being located radially from the disc center at a different distance than either of the remaining two support points, a plurality of adjustable means carried by said disc for successive cooperation with said one such support point as said disc is turned with said shaft, said adjustable means being oriented with respect to said disc center so that each adjustable means represents an index position, said disc having a tilt at an index position which may be determined by the adjustment of the corresponding active adjustable means, said device having a means responsive to the tilt of said disc to be controlled for each index position.

2. The construction according to claim 1 wherein said remaining two support points for the disc comprise posts arranged to cooperate with the peripheral portion of the disc and wherein said one such support point is located nearer the center of the shaft than the remaining two support points.

3. The construction according to claim 2 wherein said adjustable means carried by said disc include bolts.

4. A fine tuning attachment for use with a device having an end panel and a shaft projecting from said panel outwardly, said shaft being rotatable to a plurality of index positions, said attachment comprising a flat, rigid disc having a central aperture for clearing said shaft, said disc when threaded over said shaft being tiltable with respect to said shaft, means for rotatably coupling said disc to turn with said shaft, means for urging said disc to slide along said shaft toward said panel, means on said panel providing a three point support disposed around said shaft for defining the plane in which said disc will lie in response to said disc urging means, one such support point being located radially from the shaft center at a different distance than the remaining two support points, a plurality of adjustable means carried by said disc and positioned around said shaft, said plurality of adjustable means being adapted to cooperate with said one such support point on said panel in different rotary positions of said disc, said adjustable means being oriented with respect to said disc center so that each adjustable means when cooperating with said one such support point corresponds to an index position, each adjustable means providing for an independent position of said disc insofar as a three point support is concerned and a finger carried by said panel, longitudinally movable and cooperating with said disc to be adjusted by the disc position for each index position.

5. The construction according to claim 4 wherein said one such support point on the panel has a flat region for permitting some play of the disc with respect to said one such support point without substantial effect on the three point support plane.

6. A fine tuning attachment for use with a device having a front panel and a shaft projecting forwardly from said panel and rotatable to a plurality of index positions, said attachment comprising a flat, rigid disc having a central aperture for clearing said shaft, said disc being tiltable with respect to said shaft, means for rotatably coupling said shaft and disc so that said disc may turn with said shaft while being free to tilt, means around said shaft for urging said disc along said shaft toward said front panel, a pair of posts carried by said front panel for cooperating with said disc, means carried by said front panel for determining one disc support point which together with said two posts will provide a three point support for said disc to determine the disc tilt plane, said one support point being located closer to the center of the shaft than the two posts, a plurality of adjustable members carried by said disc, there being one adjustable member for each index position and said adjustable members being so oriented as to successively cooperate with said one support point at index positions, and a movable finger extending from said front panel toward said disc and cooperating therewith to be positioned by the tilt plane of said disc.

7. The construction according to claim 6 wherein said movable finger and said one support point are radially in line with respect to the center of said shaft.

8. The construction according to claim 7 wherein said movable finger is radially further from the center of the said shaft than said one support point.

9. A fine tuning attachment for use with a device having a front panel and having a shaft projecting forwardly from said panel, said shaft being rotatable to a plurality of index positions, said attachment comprising a flat, rigid disc having a central aperture for permitting said disc to clear said shaft and be threaded thereover, said disc being tiltable with respect to said shaft, means for rotatably coupling said disc and shaft so that said disc can turn with said shaft and still be free to tilt with respect to said shaft, spring means for urging said disc along said shaft toward said front panel, means carried by said front panel for defining three points of support for limiting said disc movement toward said front panel in such a way as to cause said disc to tilt to a predetermined position, two of said support points being relatively fixed and cooperating with the disc near the edge thereof, the remaining support point being located radially nearer the center of said shaft than the first named two support points, said remaining support point providing a raised portion projecting from said front panel and having a flat region, means carried by said disc and projecting toward the front panel for engaging said flat region, said disc supported means comprising individually adjustable means corresponding in number to the index positions through which said shaft is movable and properly oriented so that an individually adjustable means at a corresponding index position will rest upon said flat portion and a movable finger adapted to engage an edge portion of the disc, said finger having its position determined by the tilt of said disc, the bias means urging said disc toward said front panel providing a force which insures proper setting of said disc on said three point support means in spite of any resistance offered by said finger to being moved.

10. The construction according to claim 9 wherein said disc coupling means includes a slot and pin engaging said slot.

11. The construction according to claim 10 wherein said finger is disposed to cooperate with the edge portion of said disc at a point substantially radially in line with said one support means.

12. The construction according to claim 11 wherein one of the two support points which are normally relatively fixed has manual means for adjusting the same, said manual means being readily available and to be used by a TV viewer in the event that the individually adjustable means is available only to a service man.

References Cited in the file of this patent

UNITED STATES PATENTS

| | | |
|---|---|---|
| 2,342,691 | Plensler | Feb. 29, 1944 |
| 2,469,035 | Gourdon | May 3, 1949 |
| 2,534,768 | Hall | Dec. 19, 1950 |
| 2,613,540 | Keim | Oct. 14, 1952 |
| 2,901,615 | Devendorf | Aug. 25, 1959 |

FOREIGN PATENTS

| | | |
|---|---|---|
| 395,674 | Great Britain | Oct. 14, 1931 |